United States Patent [19]

Gabor

[11] Patent Number: 4,992,862
[45] Date of Patent: Feb. 12, 1991

[54] COLOR CONVERSION DISPLAY APPARATUS AND METHOD

[75] Inventor: Akiva P. Gabor, Ra'anana, Israel

[73] Assignee: Scitex Corporation, Ltd., Herzlia, Israel

[21] Appl. No.: 331,347

[22] Filed: Mar. 31, 1989

[30] Foreign Application Priority Data

Apr. 18, 1988 [IL] Israel .................................. 86107

[51] Int. Cl.$^5$ .............................................. H04N 1/46
[52] U.S. Cl. ...................................... 358/76; 358/78; 358/80
[58] Field of Search .................... 358/75, 76, 80, 78

[56] References Cited

U.S. PATENT DOCUMENTS

| | | |
|---|---|---|
| 4,349,835 | 9/1982 | Horiguchi et al. .................. 358/76 |
| 4,468,692 | 8/1984 | Yamada et al. ..................... 358/76 |
| 4,486,772 | 12/1984 | Klie et al. ........................... 358/80 |
| 4,573,071 | 2/1986 | Sakamoto ............................ 358/76 |
| 4,598,282 | 7/1986 | Pugsley ............................... 340/799 |
| 4,639,770 | 1/1987 | Jung et al. . | |
| 4,649,423 | 3/1987 | Hoffrichter et al. . | |
| 4,661,843 | 4/1987 | Sekizawa et al. . | |
| 4,727,425 | 12/1987 | Mayne et al. . | |

Primary Examiner—Howard W. Britton
Attorney, Agent, or Firm—Pearne, Gordon, McCoy & Granger

[57] ABSTRACT

Color conversion apparatus for video display of color images represented by printing data associated with a non-additive system of color components and including apparatus for generating a first set of values each of which depends on one of the non-additive color components in accordance with a selected color reproduction function, apparatus for generating a second set of values each of which depends on two of the non-additive color components in accordance with the selected color reproduction function and apparatus for generating an output signal in which a summation of the first and second sets of values is provided as the value of a component of an additive system associated with video data color components for use in display of the color image.

21 Claims, 3 Drawing Sheets

COLOR CONVERSION DISPLAY APPARATUS AND METHOD

FIELD OF THE INVENTION

The present invention relates to apparatus and methods for video color proofing of print data, and more particularly, to an apparatus useful for converting color printing data to a video display format so that color accuracy is preserved.

BACKGROUND OF THE INVENTION

The printing industry generally uses a particular group of color inks for printing on white paper so as to form a color image. The inks from which the color image is produced are cyan (C). magenta (M). yellow (Y) and black (K). The same color image is displayed on color monitors for editing and proofing purposes, and this requires a video data format for producing the color image based on red (R). green (G) and blue (B) phosphors which are provided by a color CRT.

For real-time editing, the picture color information must be stored in the display memory in terms of CMYK printing data, since available scanner data is usually stored in this format, and since most users are accustomed to it. However, the display itself must be provided in terms of the RGB video display color format. Therefore, a fast transformation is needed to convert the CMYK data into the RGB format. Since the color system of printing inks is non-additive, and is in fact partially subtractive, while the video display color monitor operates on an additive system of colors, the transformation cannot be represented by a linear function.

In the prior art of transformations for use in video retouching systems, U.S. Pat. No. 4,668,980 to Stansfied et al. discloses a method in which the original image is defined in terms of a limited plurality of reference colors. This is considered to simplify the retouching method since the limited plurality of reference colors can be rapidly converted in real time from printing ink colors to a video display color format.

However, the use of a reference data set for defining the colors of the original may introduce contouring, which is the term for the artifacts which appear in the converted image. This occurs because of the approximation error resulting from quantization of the full range of colors in the original image into a limited number of reference data set values. This technique necessarily requires smooth transitions in color to be degraded into fewer possible color variations, with discontinuities between them. In the Stansfield et al patent, contouring is introduced by defining each pixel of the image in terms of one of 256 reference colors rather than a possible $256^3$ colors.

Another prior art color transformation technique is disclosed in European Patent Specification No. 0090596, which proposes calculation of a set of RGB tables that corresponds to a set of CMYK tables for neutral colors only, on the assumption that neutral colors are the most important. Where large changes to saturated colors occurs, this system may introduce both contouring and false colors.

In design of color transformation functions, it must be recognized that a conversion error results in the wrong color, and that a discontinuity in the approximation introduces artifacts (contouring) in the smooth changes of color. This means that accurate color rendition and lack of contouring are, in general, conflicting constraints for a given hardware size.

The existence of these conflicting constraints is important where the system must handle the most general case. When the image is synthetic, color accuracy is less critical than contouring. Alternatively, for a colorful (noisy) real image, contouring may be ignored, provided there is no smooth transition of colors over a large enough area to produce disturbing contours. The difficulty arises when the most general images are to be accommodated on the hardware configuration. The prior art indicates that addressing both accuracy and smoothness constraints amounts to a five-to-ten fold increase in hardware requirements, depending on the reference hardware.

Therefore, it is desirable to provide a color conversion system useful for video display of printing data which is accurate, provides smoothness in transition between colors, allows for real-time editing, and uses as little hardware as possible.

SUMMARY OF THE INVENTION

Accordingly, it is a principal object of the present invention to overcome the above-mentioned disadvantages and provide a color conversion apparatus for video display of color printing data. The apparatus provides accurate color conversion while maintaining the smoothness of color transitions, and operates at a speed which enables real-time editing.

In accordance with a preferred embodiment of the invention there is provided a color conversion apparatus for video display of color images represented by printing data associated with a non-additive system of color components, said apparatus comprising:

apparatus for generating a first set of values each of which depends on one of the non-additive color components in accordance with a selected color reproduction function;

apparatus for generating a second set of values each of which depends on two of the non-additive color components in accordance with the selected color reproduction function; and apparatus for generating an output signal represented by a summation of the first and second set of values which is provided as the value of a component of an additive system associated with video data color components for use in display of the color image.

In a preferred embodiment, the color conversion display apparatus is provided in a hardware configuration which receives as input the color printing data format associated with the density of colors in a color image to be printed in accordance with standard printing inks, cyan (C), magenta (M), yellow (Y) and black (K). This input data represents the color image in a non-additive system and is stored in a frame buffer for use by a converter portion of the color conversion apparatus. Here, the values associated with each of the main color components C, M and Y are fed to module for transformation into a set of values dependent on individual color components and on combinations of two of them.

Once the values and their dependencies have been defined by resort to a selected color reproduction function, the converter portion performs the conversion itself. In accordance with the principles of the present invention, it has been determined that each of the main components of the additive system (RGB) associated with the video data color components depends on a function of just one or two components of the non-additive system. Thus, the converter provides a set of lookup tables (LUT) by which the conversion is made individually for each value.

For the values dependent on a single non-additive color component, a one-dimensional LUT is used for the conversion, with the result being a color component for use by the additive system associated with the video data color components. The values dependent on two non-additive color components are converted by use of just one two-dimensional LUT.

The black color component K does not change the hue of the resulting video data color components produced by the transformed values. Thus, the black color component can be incorporated by use of a staged synthesis technique in which it modifies the already transformed values. In the preferred embodiment, the modification is performed by multiplication of a transformed value of the black color component with the transformed values produced by the converter portion of the apparatus.

In the preferred embodiment, the novel color conversion display apparatus uses three one-dimensional LUTs and one two-dimensional LUT, with the result that the size of the hardware configuration is greatly reduced without losing quality of the converted color image. An important benefit of the hardware size reduction is that the apparatus operates at video speed and is useful in real-time editing.

It is a feature of the invention that the selected color reproduction function provides adjustment for the luminance range of each color component in the color printing format to match the video display monitor colors, which is equivalent to reducing the illumination of the printed paper by a certain amount.

Another feature of the selected color reproduction function is that it modifies the video data color components so as to produce a display which has the appropriate luminance contrast. Since the display monitor is viewed in dim surroundings, the colors of the display image look brighter, but this affects the dark colors more than the light colors. As a result the luminance contrast is reduced. This modification is needed to overcome this adaptation effect, and is based on a gamma gradation function by which the luminance contrast is increased to the required level.

Other features and advantages of the invention will become apparent from the drawings and the description contained hereinbelow.

BRIEF DESCRIPTION OF THE DRAWINGS

For a better understanding of the invention with regard to the embodiments thereof, reference is made to the accompanying drawings in which like numerals designate corresponding elements or sections throughout, and in which.

DETAILED DESCRIPTION OF A PREFERRED EMBODIMENT

Figure 1:
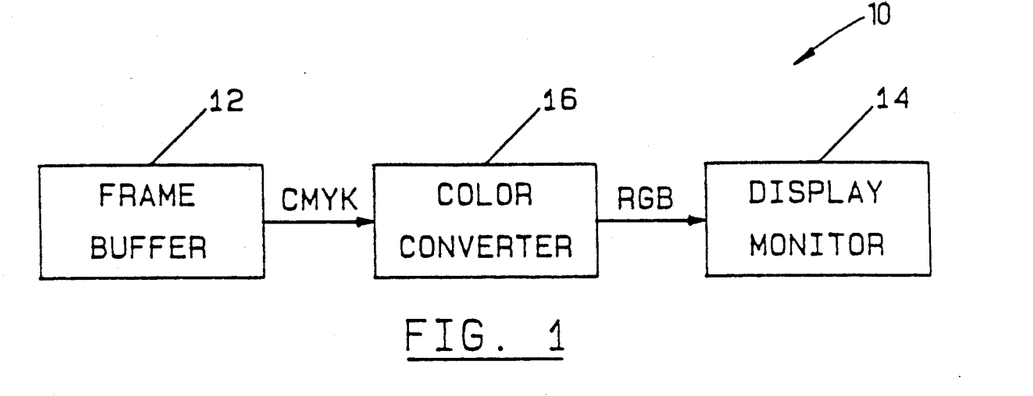
FIG. 1 shows an overall configuration of a preferred embodiment of a color conversion display apparatus constructed and operated in accordance with the principles of the present invention.

Referring now to FIG. 1, there is shown a preferred embodiment of a color conversion display apparatus 10 constructed and operated in accordance with the principles of the present invention. A frame buffer 12 of a display memory is fed with color printing data in a standard CMYK format which may be used in a scanner, printer or other color imaging system. As part of the real-time editing process in pre-print systems, the picture color information is maintained in the display memory via frame buffer 12, and is available for necessary adjustments to the color printing data which are made by the user who views the image on a color display monitor 14. As the color display monitor 14 is a video device and is operated based on the standard RGB phosphor colors of a CRT, a color converter 16 is used to provide the required fast transformation between the CMYK color printing data format and the RGB video color format.

Since the color system of printing inks is non-additive, while the color display monitor uses an additive system of colors, a non-linear transformation function F is needed to achieve the conversion between them. This can be represented as:

$$F:CMY(K) \to RGB \qquad (1)$$

A determination of this function for purposes of the inventive apparatus can be developed using colorimetric measurements of printed color patches as described further herein.

Figure 2:
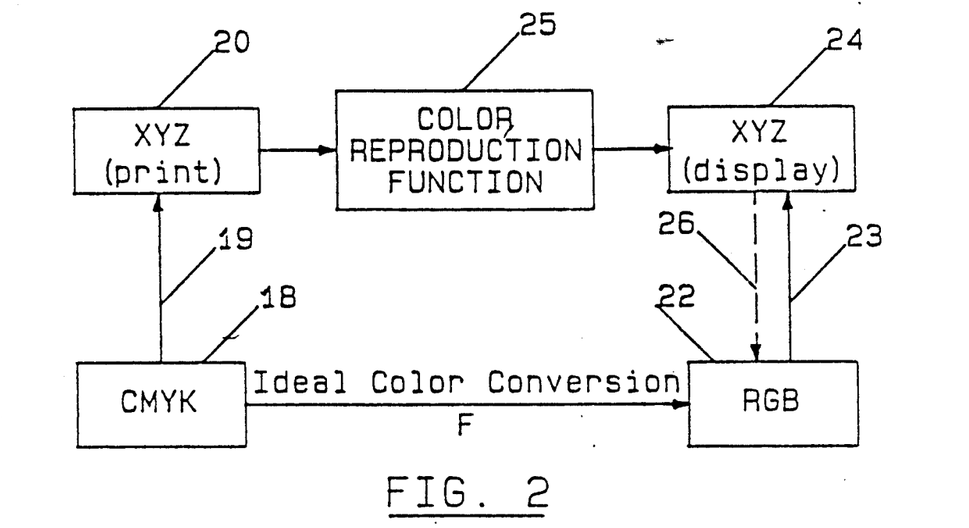
FIG. 2 shows a schematic diagram of a color conversion technique associated with the apparatus of FIG. 1.

FIG. 2 presents a schematic diagram of the color conversion technique associated with the color conversion display apparatus of FIG. 1. For frame buffer 12 of FIG. 1, there is shown a corresponding data set 18 containing CMYK printing data. A set 20 of tristimulus values XYZ is associated with CMYK data set 18. For display monitor 14 a data set 22 is shown containing RGB data. As with CMYK data set 18, a set 24 of tristimulus values XYZ is associated with RGB data set 22.

Analysis of the colorimetric relationship between data sets 18 and 22 of the respective CMYK (non-additive) and RGB (additive) systems can be performed using a colorimeter. The colorimeter is used to measure tristimulus values XYZ for printed test patches in data set 18, each patch having different values of CMYK under standard illumination. These XYZ values are provided via 19 to set 20. The same type of measurement can be made under standard (fixed) conditions with a calibrated display monitor 14 of different levels of illumination of single phosphors for various values in data set 22 of R, G and B, such that for R, the value XYZ (R,0,0) is measured, and provided via 23 to set 24.

In making the above measurements, it is determined that the range of the XYZ values (set 20) measured for the printed test patches (CMYK data set 18) is three or four times the XYZ values (set 24) measured for the screen (RGB data set 22). Thus, without changing the hue of each color, a color reproduction function 25 is needed to match the color sensation as described in the paper entitled "Objectives in Color Reproduction", R.

W. G. Hunt, ISSC Proceedings (1971), Graphic Arts Research Center, Rochester Institute of Technology.

In the preferred embodiment, the color reproduction function 25 is a mapping function selectively adjustable by the operator for specific conditions, relating to brightness and contrast adaptation effects. A scaling factor α is used to match the brightness of the colors. A reference value for the scaling factor o can be established by setting the XYZ for the white of the paper at the value for brightest white of the display monitor 14 screen.

The transformation function F must account for the fact that the display monitor 14 has a different range of luminance from the printed page and is viewed under different surrounding light conditions. This is accounted for in conversion of XYZ (CMYK) values in set 20 to XYZ (RGB) values in set 24 using the color reproduction function 25. This amounts to scaling the value of the luminance, e.g., using a gamma gradation function to increase the contrast, without affecting the hue. An example of the use of a gamma transformation to increase the contrast to the required level, is described by Hunt in the above-cited paper.

Having the values XYZ (CMYK) in set 20 and XYZ (RGB) in set 24 and incorporating the color reproduction function 25 between the XYZ values in set 20 and those in set 24, the ideal color conversion can be expressed as in terms of the transformation function F as:

$$F(CMYK) = RGB \quad (2)$$

This relationship calls for a function F which makes the screen of the display monitor 14 look like the paper by making their colors equal. By making the measurements described, and using the computed inverse of the XYZ (RGB) values in set 24 which are provided via 26 to RGB data set 22, a full transformation table of the function F can be generated.

Once the transformation function F between CMY values of printing inks and RGB inputs to the display monitor 14 has been defined in accordance with equation (1) an approximation of this function can be provided in a hardware configuration. The requirements of the approximation are:

(a) accuracy of each color;
(b) smoothness in transition from one color to another;
(c) speed of computation; and
(d) size of realizing hardware.

In order to use as little hardware as possible and as few computational stages as possible to meet speed requirements the invention uses look-up tables (LUT) which are large memory arrays. The basis for this arrangement is now described.

If the most general and continuous function is to be represented using a LUT of a given size, it can be seen that accuracy must be compromised for smoothness i.e., reduced quantization error. That is, for a scalar function f(x), a uniform k grid of values can be chosen in x space to represent the function. If only k values can be addressed in the range of the scalar variable x choosing the grid points close to one another increases smoothness over a certain range, but the approximation error grows for values outside this range, which means that accuracy is reduced.

However, if the function to be represented is known to belong to a limited class of functions this knowledge can be incorporated into the hardware configuration to reduce the level of compromise between accuracy and smoothness. Thus, the range of functions that can be represented by the hardware is reduced, since some functions cannot be represented, but those of interest can be represented with higher accuracy and smoothness.

An example of this approach can be seen in the case of two input variables x and y, each of which is assumed to have 100 possible values, where the function to be represented is approximately in the family $F(x,y) = f(x) + g(y)$ for any function $f,g$ (e.g. $x^2 + y^3$). Accurate representation as a general function of two variables requires the LUT to be constructed with a size of $100 \times 100$ memory cells, to accommodate each possible combination of x and y.

However, knowing in advance that the function to be represented is of the form $F(x) = f(x) + g(y)$, a hardware configuration can be provided with two LUTs, each having a memory of 100 cells (total 200), where their outputs are fed to an adder to produce F(x). Similarly, by use of an approximation of the dependency of RGB values on the CMYK data, the size of the hardware can be reduced, while a high level of accuracy and smoothness is retained.

Figure 3:
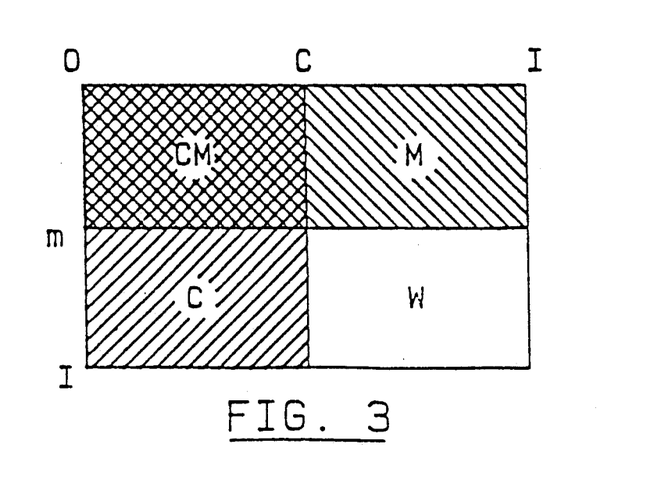
FIG. 3 shows a representation of a printed patch of the halftone process associated with a color printing format used with the apparatus of FIG. 1.

Referring now to FIG. 3, there is shown a representation of a printed patch of the halftone process associated with a color printing format used with the color conversion apparatus of FIG. 1. Two colors are used in this representation, C and M, which are printed in a patch with a C screen having a dot size (where 1 is a solid, i.e., 100%) $0 < c < 1$ and with M screen having a dot size $0 < m < 1$. The four colors laid side by side as shown in FIG. 2 are of sizes represented by the following: W (white) is represented by $(1-c)(1-m)$; C is represented by $c(1-m)$; M is represented by $m(1-c)$, and CM (the color obtained when a layer of M is placed over a layer of C) is represented by cm.

Each transformation function F which is additive for additive colors, like X, Y and Z, satisfies:

$$F(cC + mM) = (1-c)(1-m)F(W) + c(1-m)F(C) + \quad (3)$$
$$m(1-c)F(M) + cmF(CM)$$

Thus, it can be seen that F is a quadratic function of c, m. For the three basic colors, C, M and Y, an approximate representation of the transformation function F is given as a sum as follows:

$$F(c,m,y) = A + B_0 c + B_1 m + B_2 y + D_0 cm \quad (4)$$
$$+ D_1 cy + D_2 my + Ecmy$$

The linear part of equation (4) represents the additive part of the color mixture, and can be handled by one-dimensional LUT, since it is only dependent on one color component.

The desired phosphors R, G and B can each be represented, to a good approximation, by just one of the second order terms of equation (4), and not by the cubic term cmy. The calculations involve the expansion of equation (4) and an estimate of the error relative to the eye-sensitivity. This analysis reveals that for each color component R, G and B, there exists a dependency on two color components of C,M,Y, such that just one two-dimensional LUT and one to three one-dimensional LUTs give the dependence on C,M,Y.

Figure 4A:
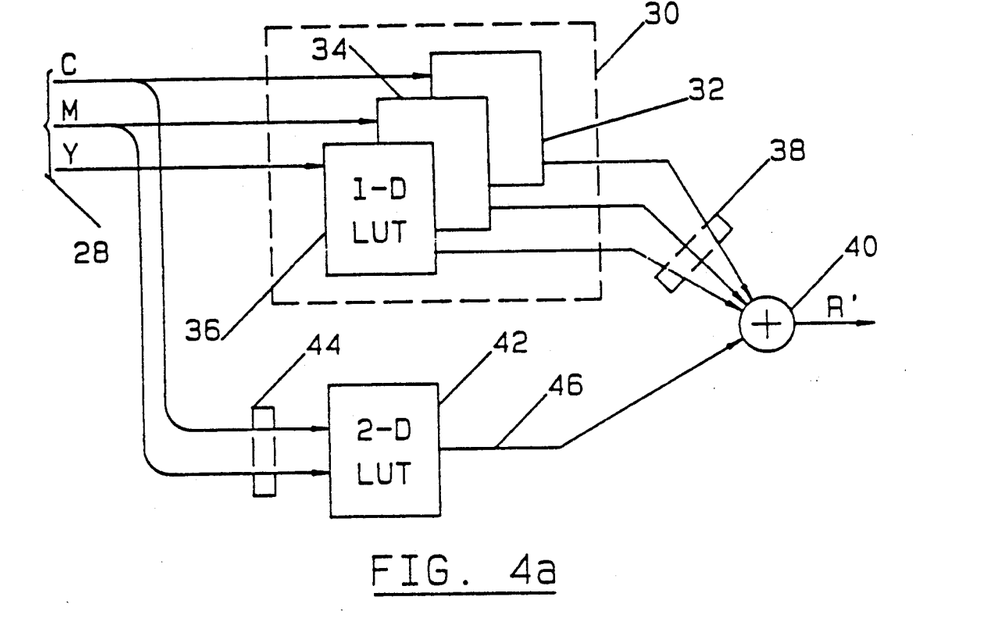
FIGS. 4a–b show schematic diagrams of a hardware configuration for single channels of the apparatus of FIG. 1.
Figure 5:
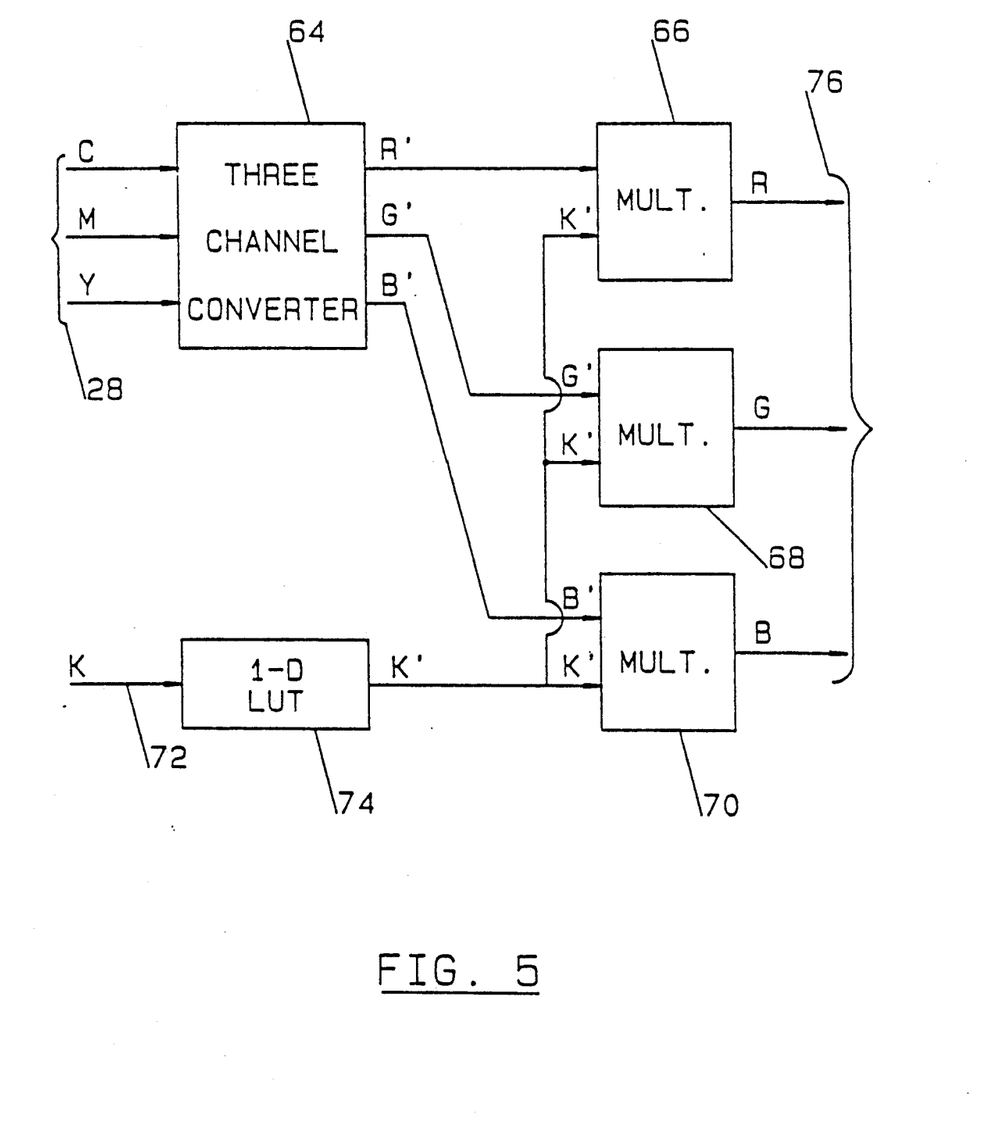
FIG. 5 shows a schematic diagram of a converter portion of the color conversion display apparatus incorporating three of the channels shown in FIG. 4.

Referring now to FIG. 4a, there is shown a schematic diagram of a hardware configuration for a single channel of the color conversion apparatus of FIG. 1. In particular, the R channel is shown, where the colors C, M, and Y are provided by the frame buffer 12 as 8-bit data on lines 28 to an additive converter portion 30 comprising three one-dimensional LUTs respectively 32, 34 and 36, each of which converts the color it receives by use of the relation established in equation (4). These converted values are output on lines 38 to a summer 40, for use in generating the value of R', which is used to generate R (FIG. 5).

As stated earlier with regard to equation (4), the dependency of R on just two of the color components of C,M,Y (in particular C and M) requires that corresponding ones of lines 28 are fed to a two-dimensional LUT 42 as 6-bit data on lines 44. The output 46 is fed as 8-bit data to summer 40, such that the sum of the output on lines 38 from the additive converter portion 30 and output 46 fully determines the value of R'.

Figure 4B:
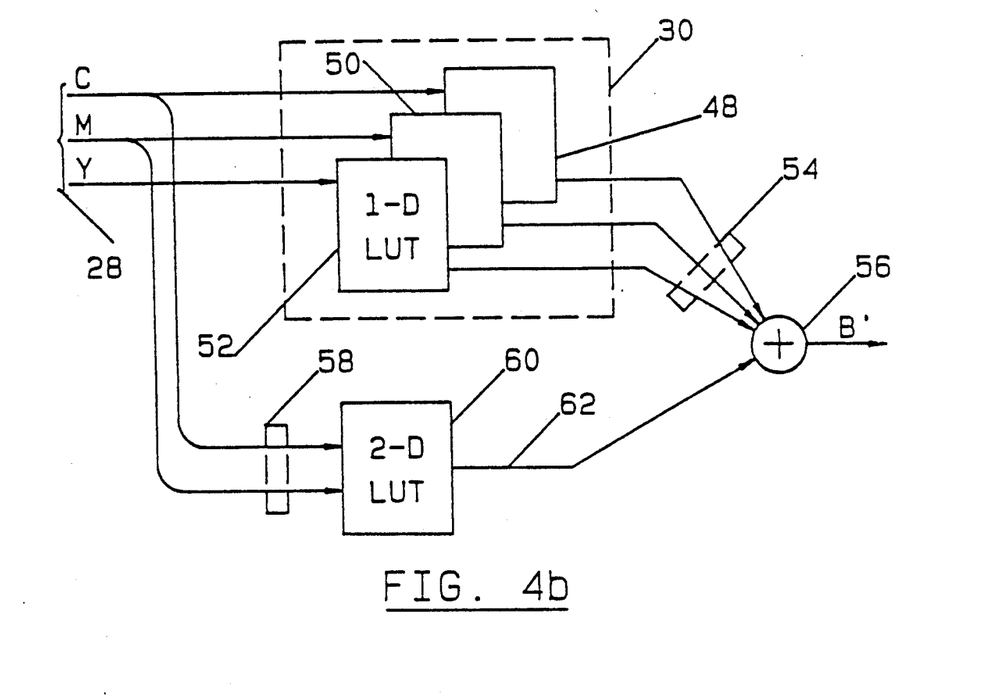

In accordance with the present invention, the configuration shown in FIG. 4a is repeated for the channel corresponding to the G color component, and again, the C and M color components are used as input to the two-dimensional LUT 42. For the B channel as shown in FIG. 4b, the same configuration is used, but in this case additive converter portion 30 comprises one-dimensional LUTs 48, 50 and 52 which feed their outputs on lines 54 to summer 56. Lines 58 provide the M and Y components as inputs to a two-dimensional LUT 60 which feeds summer 56 with output 62 to generate B'.

While the preferred embodiment uses three one-dimensional LUTs and one two-dimensional LUT, it will be appreciated by those skilled in the art that the dependencies shown may be varied where the definition of the components forming the video display additive system vary from one display monitor 14 manufacturer to another, or where different standards are used.

Referring now to FIG. 5, there is shown a schematic diagram of the color converter 16 portion of color conversion apparatus 10 incorporating three of the channels shown in FIGS. 4a-b. A three-channel converter 64 comprising three single channel converters per FIGS. 4a-b provides conversion of the color printing data which is input on lines 28. The outputs R', G' and B' are fed to a respective set of multipliers 66, 68 and 70.

In accordance with the present invention, the black color component K in the CMYK format does not change the hue of the displayed color image. Thus, it can be treated as a separate input 72 which is transformed through a one-dimensional LUT 74 to provide an output K' which is used to modify the outputs R', G', and B' from three channel converter 64. This modification of the results of a transformation by a color component is defined as a staged synthesis technique.

In the preferred embodiment, the staged synthesis technique is applied to modify the R', G' and B' outputs by using output K' of LUT 74 as a multiplication factor which is provided to each of multipliers 66-70. The resulting RGB outputs 76 are then fed to the display monitor 14 where the converted image is viewed for editing and proofing purposes.

It will be appreciated by those skilled in the art that the staged synthesis technique may be applied in other arrangements which involve different color component dependencies. Various combinations of LUTs, summation and multiplication functions enable an appropriate conversion to be achieved between color components in different systems.

From the foregoing description, it will be appreciated by those skilled in the art that the present invention uses several techniques to provide the color conversion from CMYK to HGB:

(1) a scaling factor $\alpha$ is used to match ranges of the colors represented by the printing data and those seen on the CRT of display monitor 14;

(2) gamma gradation is applied to cancel the chromatic adaptation effect of dark surroundings;

(3) the hardware configuration assures that the increase of color rendition accuracy does not compromise smoothness by introducing undesired quantization contours;

(4) the special characteristics of the tristimulus values XYZ (CMY) are used to reduce the hardware size by a hardware configuration comprising three one-dimensional LUTs and one two-dimensional LUT; and (5) the black color component K can be incorporated by a staged synthesis technique using a second set of two-dimensional LUTs or using multipliers and one-dimensional LUTs.

As indicated in point 4 above, because the size of the hardware configuration is reduced, the color conversion can be generated at video speed with high quality.

Having described the invention in connection with certain specific embodiments thereof, it is to be understood that the description is not meant as a limitation since further modifications may now suggest themselves to those skilled in the art and it is intended to cover such modifications as fall within the scope of the appended claims.

I claim:

1. A color conversion apparatus for video display of color images represented by printing data associated with a non-additive system of color components, including a plurality of non-additive color components, said apparatus comprising:
   means for generating a first set of values each of which depends on one of said plurality of non-additive color components in accordance with a selected color reproduction function;
   means for generating a second set of values each of which depends on only two of said plurality of non-additive color components in accordance with the selected color reproduction function; and
   means for generating an output signal including a summation of said first and second sets of values, said summation representing the value of a component of an additive system associated with video data color components for use in display of the color image.

2. The apparatus of claim 1 wherein said means for generating said second set of values comprises a two-dimensional look-up table (LUT) for converting said two of said non-additive color components.

3. The apparatus of claim 1 wherein said selected color reproduction function provides adjustment to match each color component in the color printing data to the video display monitor colors, by application of a scaling factor for the luminance range and a gamma gradation function for the luminance contrast, so as to produce a display adjusted to the required level for each of said luminance criteria.

4. The apparatus of claim 1 wherein said means for generating said first set of values comprises a one-dimensional look-up table (LUT) for converting said one non-additive color component.

5. The apparatus of claim 4 wherein said means for generating said second set of values comprises a two-dimensional look-up table (LUT) for converting said two of non-additive color components.

6. The apparatus of claim 1 wherein said printing data is stored in a frame buffer for use by means for generating said first and second sets of values.

7. The apparatus of claim 6 wherein said means for generating said first set of values comprises a one-dimensional look-up table (LUT) for converting said one non-additive color component.

8. The apparatus of claim 6 wherein said means for generating said second set of values comprises a two-dimensional look-up table (LUT) for converting said two of said non-additive color components.

9. The apparatus of claim 1 further comprising means for generating a value dependent on a value associated with one of said plurality of non-additive color components, wherein said generated value modifies said output signal in a staged synthesis fashion.

10. The apparatus of claim 9 wherein said generated value modifies said output signal by multiplication with the summation of said first and second values.

11. The apparatus of claim 9 wherein said means for generating said values comprises a one-dimensional look-up table (LUT).

12. The apparatus of claim 1 wherein said printing data and said non-additive system are based on the density of cyan (C), magenta (M), and yellow (Y) printing inks in the color image.

13. The apparatus of claim 12 wherein said means for generating said first set of values comprises a one-dimensional look-up table (LUT) for converting said one non-additive color component.

14. The apparatus of claim 12 wherein said means for generating said second set of values comprises a two-dimensional look-up table (LUT) for converting said two of said non-additive color components.

15. The apparatus of claim 12 wherein said printing data is stored in a frame buffer for use by said means for generating said first and second sets of values.

16. The apparatus of claim 15 wherein said means for generating said second set of values comprises a two-dimensional look-up table (LUT) for converting said two of said non-additive color components.

17. For use in video display of color images, a method of converting color images represented by printing data associated with a non-additive system of color components, said method comprising the steps of:
generating a first set of values each of which depends on one of said non-additive color components in accordance with a selected color reproduction function;
generating a second set of values each of which depends on only two of said non-additive color components in accordance with said selected color reproduction function; and
generating an output signal including a summation of said first and second sets of values, said summation representing the value of a component of an additive system associated with video data color components for use in display of the color image.

18. The method of claim 17 wherein said selected color reproduction function provides adjustment to match each color component in the color printing data to the video display monitor colors, by application of a scaling factor for the luminance range and a gamma gradation function for the luminance contrast, so as to produce a display adjusted to the required level for each of said luminance criteria.

19. The method of claim 17 further comprising the step of generating a value dependent on a value associated with one of said non-additive color components, wherein said generated value modifies said output signal in a staged synthesis fashion.

20. The method of claim 19 wherein said generated value modifies said output signal by multiplication with the summation of said first and second values.

21. Color conversion apparatus for video display of color images represented by printing data associated with a non-additive system of color components, including a plurality of non-additive color components, said apparatus comprising:
means for generating a first set of values each of which depends on one of said plurality of non-additive color components in accordance with a selected color reproduction function; and
means for generating a second set of values each of which depends on said plurality of non-additive color components, wherein the dependence on at least one of said non-additive color components is different than on another.

* * * * *

UNITED STATES PATENT AND TRADEMARK OFFICE
CERTIFICATE OF CORRECTION

PATENT NO. : 4,992,862

DATED : February 12, 1991

INVENTOR(S) : Akiva P. Gabor

It is certified that error appears in the above-identified patent and that said Letters Patent is hereby corrected as shown below:

On the cover page under "[56] References Cited", add the following references:

--4,668,980  5/87  Stansfield et al. . . . . . . . .  358/80--

FOREIGN PATENT DOCUMENTS

--0090596      10/83  European Patent  --.

Signed and Sealed this

Twenty-first Day of September, 1993

Attest:

BRUCE LEHMAN

*Attesting Officer*           *Commissioner of Patents and Trademarks*

UNITED STATES PATENT AND TRADEMARK OFFICE
CERTIFICATE OF CORRECTION

PATENT NO. : 4,992,862
DATED : February 12, 1991
INVENTOR(S) : Akiva P. Gabor

It is certified that error appears in the above-identified patent and that said Letters Patent is hereby corrected as shown below:

Fig. 4B, should be deleted and the following Fig. 4B should be inserted.

FIG. 4B

UNITED STATES PATENT AND TRADEMARK OFFICE
CERTIFICATE OF CORRECTION

PATENT NO. : 4,992,862

DATED : February 12, 1991

INVENTOR(S) : Akiva P. Gabor

It is certified that error appears in the above-identified patent and that said Letters Patent is hereby corrected as shown below:

On the cover page under "[56] References Cited", add the following references:

--4,668,980  5/87  Stansfield et al......358/80--
Foreign Patent Documents
--0090596  10/83 European Pat. Off.--.

Signed and Sealed this

Twenty-third Day of November, 1993

*Attest:*

BRUCE LEHMAN

*Attesting Officer*   *Commissioner of Patents and Trademarks*